US008821115B2

(12) United States Patent
Bagnall et al.

(10) Patent No.: US 8,821,115 B2
(45) Date of Patent: Sep. 2, 2014

(54) SEAL ASSEMBLY

(75) Inventors: Adam M. Bagnall, Alderwasley (GB); Ross D. Maxwell, Derby (GB)

(73) Assignee: Rolls-Royce PLC, London (GB)

( * ) Notice: Subject to any disclaimer, the term of this patent is extended or adjusted under 35 U.S.C. 154(b) by 591 days.

(21) Appl. No.: 13/177,245

(22) Filed: Jul. 6, 2011

(65) Prior Publication Data
US 2012/0034072 A1 Feb. 9, 2012

(30) Foreign Application Priority Data
Aug. 3, 2010 (GB) .................................. 1013003.7

(51) Int. Cl.
*F01D 11/04* (2006.01)
*F01D 11/00* (2006.01)
*F02K 1/32* (2006.01)
*F01D 11/02* (2006.01)
*F02C 7/28* (2006.01)

(52) U.S. Cl.
CPC .............. *F01D 11/02* (2013.01); *F01D 11/001* (2013.01); *F02K 1/32* (2013.01); F05D 2240/127 (2013.01); F02C 7/28 (2013.01)
USPC ..................................... 415/171.1; 415/173.7

(58) Field of Classification Search
CPC . F01D 11/001; F01D 11/02; F05D 2240/127; F02C 7/28; F02K 1/32
USPC ........................ 415/171.1, 173.7, 174.4, 174.5
See application file for complete search history.

(56) References Cited

U.S. PATENT DOCUMENTS

| 2,123,818 | A | 7/1938 | Wegmann |
| 3,572,728 | A | 3/1971 | Smuland |
| 3,701,536 | A | 10/1972 | Matthews et al. |
| 3,897,169 | A | 7/1975 | Fowler |
| 3,940,153 | A | 2/1976 | Stocker |
| 4,513,975 | A | 4/1985 | Hauser et al. |
| 4,521,159 | A | 6/1985 | Pask |

(Continued)

FOREIGN PATENT DOCUMENTS

| DE | 10 2007 004 743 A1 | 8/2007 |
| EP | 1 515 035 A2 | 3/2005 |

OTHER PUBLICATIONS

U.S. Appl. No. 13/177,370 in name of Zoric filed Jul. 6, 2011.

(Continued)

*Primary Examiner* — Edward Look
*Assistant Examiner* — Juan G Flores
(74) *Attorney, Agent, or Firm* — Oliff PLC

(57) ABSTRACT

A seal assembly arranged adjacent to a primary flow region, the seal assembly including: first and second components; a seal arranged between the first and second components to seal a secondary flow region from the primary flow region; and a first recess portion provided in the first component and arranged adjacent to the seal and the primary flow region, the first recess portion further being arranged to receive flow from at least one of the primary flow region and the secondary flow region and shed flow to the primary flow region, wherein the first recess portion is configured to promote a first flow feature within the first recess portion, the first flow feature flowing with a portion of the first flow feature adjacent to the primary flow region and the portion of the first flow feature being shed to the primary flow region in substantially the same direction as the flow in the primary flow region.

12 Claims, 8 Drawing Sheets

(56) References Cited

U.S. PATENT DOCUMENTS

| | | | |
|---|---|---|---|
| 4,715,213 | A | 12/1987 | McGreehan et al. |
| 5,029,876 | A | 7/1991 | Orlando et al. |
| 5,244,216 | A | 9/1993 | Rhode |
| 5,639,095 | A | 6/1997 | Rhode |
| 5,833,244 | A | 11/1998 | Salt et al. |
| 5,967,745 | A * | 10/1999 | Tomita et al. .............. 415/173.7 |
| 5,984,630 | A | 11/1999 | Di Salle et al. |
| 6,164,655 | A | 12/2000 | Bothien et al. |
| 6,692,227 | B2 * | 2/2004 | Tomita et al. .............. 415/173.7 |
| 7,445,213 | B1 | 11/2008 | Pelfrey |
| 7,708,520 | B2 | 5/2010 | Paolillo et al. |
| 8,002,286 | B1 | 8/2011 | El-Aini et al. |
| 8,167,547 | B2 | 5/2012 | Wu et al. |
| 8,333,557 | B2 | 12/2012 | John et al. |
| 2008/0124215 | A1 | 5/2008 | Paolillo et al. |
| 2009/0067997 | A1 | 3/2009 | Wu et al. |
| 2009/0317232 | A1 | 12/2009 | Guemmer |
| 2010/0008760 | A1 | 1/2010 | Morris et al. |
| 2010/0074733 | A1 | 3/2010 | Little |
| 2011/0156359 | A1 | 6/2011 | Zheng et al. |

OTHER PUBLICATIONS

Nov. 12, 2013 European Search Report issued in European Application No. 11 17 2841.
Nov. 7, 2013 U.S. Office Action issued in U.S. Appl. No. 13/177,370.
Apr. 24, 2013 Office Action issued in U.S. Appl. No. 13/177,370.

* cited by examiner

SEAL ASSEMBLY

This invention relates to a seal assembly and particularly but not exclusively relates to a seal assembly for a gas turbine engine.

BACKGROUND

It is known to provide seals between moving and stationary components. In this respect FIG. 1 shows two examples of previously-proposed seal assemblies comprising labyrinth seals 30', 30" disposed between a first component 10', 10", which may rotate with respect to a second component 20', 20". The first and second components are typical of rotating and stationary components found in a gas turbine, for example a stator shroud between adjacent rotors. The examples show the geometry of the cavity downstream of a last seal fin, including the shape of the platforms which the air flows between. However, there is typically a leakage flow 50', 50" through the labyrinth seal 30', 30" and this leakage flow may return to a mainstream flow 60', 60". The first example comprises a large volume cavity 40', which may be adequate to dissipate a leakage jet from the labyrinth seal 30'. In contrast, the second example comprises a small volume cavity 40", which has little available space to dissipate a leakage jet from the labyrinth seal 30". A small cavity 40" may be required where other factors, such as the shroud geometry, do not permit a large cavity 40'.

Previous seal assembly designs have assumed that the static pressure in the cavity 40', 40" was broadly constant and that the energy of the leakage jet 50', 50" through the seal 30', 30" had dissipated prior to entering the mainstream flow-field 60', 60". This was generally true since most prior art sealing assemblies comprised relatively large volume cavity. However, in the case of a small cavity, there may not be enough space for the jet 50" to dissipate prior to entering the mainstream flow 60".

Furthermore, although it was previously accepted that a high energy jet would flow over the seal fin tips, the path of the jet through the cavity was unknown and there was no appreciation of the flow structure set up within the cavity. In addition the small cavity geometry leads to a spoiling of the mainstream flow.

As shown in FIG. 2 (which corresponds to the second example described above), the previously-proposed small cavity 40" design results in the high energy jet entering the mainstream flow 60" in a non-preferential direction, thereby resulting in a spoiling of the mainstream flow. The prior design shown in FIG. 2 allows a large captive vortex 70" to be formed by the counter-rotating vortex within the cavity 40". The vortex 70" directs the flow radially into the mainstream flow 60", thereby disturbing the mainstream flow. This disturbance may have a negative impact on the flow efficiency and hence the efficiency of a device in which the seal assembly operates.

Furthermore, in the case of small cavity 40", the labyrinth seal 30" overall radius is high relative to the mainstream flow 60". With the larger radius of the labyrinth seal 30", it is more difficult to control seal clearances due to the higher metal expansion and contraction rates. Higher leakage flow rates may therefore result for the small cavity example, thereby further exacerbating the problem.

A further example of a prior art seal assembly is shown in FIG. 3. A seal 80 may be provided between a blocker door 82 and a fan casing 84a, 84b in a thrust reverser unit 90 for a jet engine. However, steps and gaps between the fan casing 84b and blocker door 82 may generate uncontrolled vortices 86, which shed downstream and separate the mainstream flow 60 from the annulus wall. The shed vortices and/or the flow separation may have a negative impact on the flow efficiency.

The present disclosure therefore seeks to address these issues.

STATEMENTS OF INVENTION

According to a first aspect of the present invention there is provided a seal assembly arranged adjacent to a primary flow region, the seal assembly comprising: first and second components; a seal arranged between the first and second components to seal a secondary flow region from the primary flow region; and a first recess portion provided in the first component and arranged adjacent to the seal and the primary flow region, the first recess portion further being arranged to receive flow from at least one of the primary flow region and the secondary flow region and shed flow to the primary flow region, wherein the first recess portion is configured to promote a first flow feature within the first recess portion, the first flow feature flowing with a portion of the first flow feature adjacent to the primary flow region and the portion of the first flow feature being shed to the primary flow region in substantially the same direction as the flow in the primary flow region.

The seal assembly may further comprise a second recess portion, which may be provided in the first component and may be arranged between the primary flow region and the seal. The second recess portion may further be arranged to receive a first portion of a flow from the secondary flow region. The second recess portion may be configured to promote a second flow feature within the second recess portion. A surface of the second component may comprise a surface feature arranged between the primary flow region and the secondary flow region. The surface feature may be configured to promote flow separation of the flow from the secondary flow region. A second portion of the flow from the secondary flow region may bypass the second flow feature.

According to a second aspect of the present invention there is provided a seal assembly, the seal assembly comprising: first and second components; a seal arranged between the first and second components to seal a secondary flow region from a primary flow region; and a second recess portion provided in the first component and arranged between the primary flow region and the seal, the second recess portion further being arranged to receive a first portion of a flow from the secondary flow region and being configured to promote a second flow feature within the second recess portion, wherein a surface of the second component comprises a surface feature arranged between the primary flow region and the secondary flow region, the surface feature being configured to promote flow separation of the flow from the secondary flow region such that a second portion of the flow from the secondary flow region bypasses the second flow feature.

The seal assembly may comprise a first recess portion provided in the first component. The first recess portion may be arranged adjacent to the seal and the primary flow region. The first recess portion may further be arranged to receive flow from at least one of the primary flow region and the secondary flow region and shed flow to the primary flow region. The first recess portion may be configured to promote a first flow feature within the first recess portion. The first flow feature may flow with a portion of the first flow feature adjacent to the primary flow region. The portion of the first flow feature may be shed to the primary flow region in substantially the same direction as the flow in the primary flow region. The second recess portion may further be arranged to receive flow from the secondary flow region and shed flow to the first flow feature. The first recess portion may be arranged between the seal and the primary flow region. The second recess portion may be arranged between the first recess portion and the seal. The second flow feature may shed flow to the first flow feature.

The first recess portion may be configured to promote a vortical flow. The first recess portion may be arranged such that the vortical flow rotates in a direction with a portion of the vortical flow adjacent to the primary flow region. The portion of the vortical flow may be shed to the primary flow region flowing in substantially the same direction as the flow in the primary flow region.

The first component may comprise a protruding portion. The protruding portion may be arranged to guide the portion of the first flow feature into the primary flow. The protruding portion may at least partially define the first recess portion. Surfaces of the first and second components may be exposed to the primary flow region. The protruding portion may guide the primary flow from a surface of the first component to a surface of the second component. The protruding portion may for example be wedge shaped and/or tongue shaped.

The surface feature may be configured to promote flow separation of the flow from the secondary flow region such that at least a portion of the flow from the secondary flow region is directed into the first recess portion. The surface feature on the second component may comprise an edge, e.g. a sharp edge. Alternatively, the surface of the second component may comprise a rounded corner. The surface feature may be arranged between the first and second flow features.

The first and second recess portions may be adjacent one another. There may be a step change in the curvature of the surface of the first component at the interface between first and second recess portions. The first and second recess portions may be adjacent one another with a wedge shaped peak in the surface of the first component at the interface between first and second recess portions. The first and/or second recess portions may be curved. The first and/or second recess portions may be concave.

The second component may be movable from a first position, in which fluid in the primary flow region may flow over surfaces of the first and second components with the second component sealing against the first component to limit flow from the primary flow region to the secondary flow region, to a second position, in which the second component may redirect the primary flow to the secondary flow region. The first recess portion may be provided upstream of the second component with respect to the primary flow.

The first flow feature may comprise a vortex. The second flow feature may comprise a vortex.

The second component may be a static component and the first component may be a movable component movable with respect to the static component (or vice versa). The seal may comprise one or more knife edge or labyrinth seals. Knife edge portions of the seal may be provided on the first component or the second component.

A jet engine thrust reverser, turbomachine, e.g. compressor or turbine, or gas turbine may comprise the above-described seal assembly.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 4:
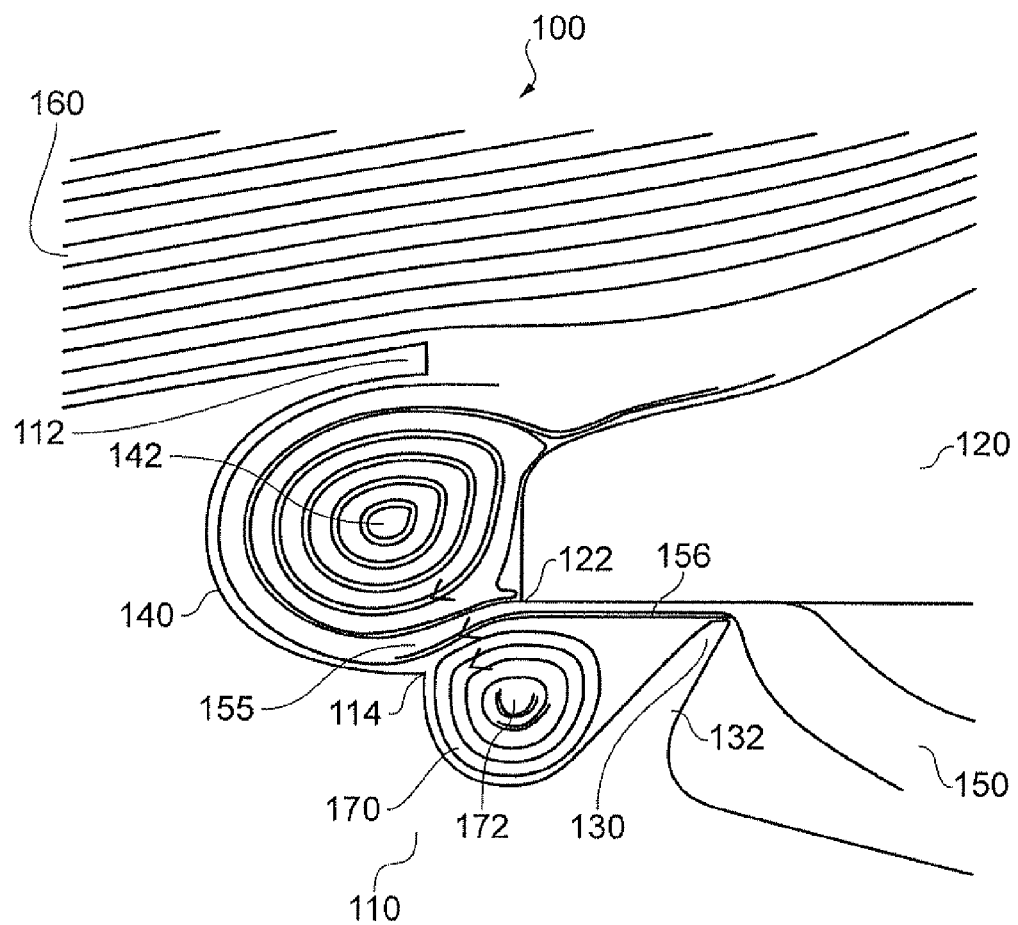
FIG. 4 shows a seal assembly according to a first example of the present disclosure.

With reference to FIG. 4, a seal assembly 100 according to a first example of the present invention may comprise a seal 130 arranged between first and second components 110, 120. The second component 120 may be a static component and the first component 110 may be a movable component movable with respect to the static component (or vice versa). The first component 110 may rotate with respect to the second component 120. The seal 130 may comprise one or more knife edge or labyrinth seals. Knife edge portions or fins 132 of the seal may be provided on the first component 110. The seal 130 may seal a secondary flow region 150, e.g. a non-mainstream flow, from a primary flow region 160, e.g. a mainstream flow.

A flow passage 155 from the secondary flow region 150 to the primary flow region 160 may be defined by surfaces of the first and second components 110, 120. The primary flow region 160 may comprise a fluid, e.g. air, which flows over surfaces of the first and second components 110, 120. A leakage flow 156 may flow from the secondary flow region 150 through a gap in the seal 130 and flow passage 155 to the primary flow region 160. The leakage flow 156 may join the fluid flow in the primary region 160.

The seal assembly 100 may further comprise a first recess portion 140, which may be provided in a surface of the first component 110 and in the passage 155. The first recess portion 140 may be arranged between the seal 130 and the primary flow region 160. The first recess portion 140 may further be arranged to receive a flow from the secondary flow region 150, e.g. leakage flow 156 through the seal 130, and deliver flow to the primary flow region 160. The first recess portion 140 may be configured to promote a first flow feature 142, e.g. a vortex, within the first recess portion. (In the case of rotating first (or second) component, the vortex may be in the form of a toroidal vortex.) The first flow feature 142 may flow with a portion of the first flow feature adjacent to the primary flow region 160. The portion of the first flow feature 142 may be shed to the primary flow region 160 in substantially the same direction as the flow in the primary flow region at the interface between the first and second components 110, 120.

The seal assembly 100 may further comprise a second recess portion 170, which may be provided in a surface of the first component 110 and in the passage 155. The second recess portion 170 may be arranged between the first recess portion 140 and the seal 130. The second recess portion 170 may further be arranged to receive a first portion of the leakage flow 156 from the secondary flow region 150. The second recess portion 170 may be configured to promote a second flow feature 172, e.g. a vortex, within the second recess portion. The second flow feature 172 may shed flow to the first flow feature 142.

A surface of the second component 120 in the passage 155 may comprise a surface feature 122. The surface feature 122 may be configured to promote flow separation of the leakage flow 156 from the secondary flow region 150. A second portion of the leakage flow 156 from the secondary flow region 150 may bypass the second flow feature 172. As a result, some of the leakage flow 156 may enter the first flow feature 142 and the remainder may enter the second flow feature 172. The surface feature 122 may comprise an edge, e.g. a sharp edge. Alternatively, the surface of the second component may comprise a rounded corner. The surface feature may be arranged between the first and second flow features 142, 172.

The first component 110 may comprise a protruding portion 112. The protruding portion 112 may be arranged to guide the portion of the first flow feature 142 into the primary flow 160. The protruding portion 112 may at least partially define the first recess portion 140. The protruding portion 112 may guide the primary flow from a surface of the first component 110 to a surface of the second component 120. The protruding portion 112 may be wedge shaped and/or tongue shaped.

The first and second recess portions 140, 170 may be adjacent one another. There may be a step change in the curvature of the surface of the first component at the interface between first and second recess portions. The first and second recess portions 140, 170 may be adjacent one another with a peak 114 in the surface of the first component 110 at the interface between first and second recess portions. The first and/or second recess portions 140, 170 may be curved. The first and/or second recess portions 140,170 may be concave.

Fluid in the secondary flow region 150 may be at a high pressure and the leakage flow 156 may flow over the seal fin 132 as a high energy jet. As the leakage flow passes over the fin 132 a second captive vortex, e.g. second flow feature 172, may be formed. This vortex may be anticlockwise (as viewed in FIG. 4) and may be favourable because it initially traps the emerging jet along the surface of the second component 120 until the edge 122, from whereon the second vortex assists to pull the flow downwards towards the peak 114 helping to form a first captive vortex, e.g. first flow feature 142. The second captive vortex may be smaller than the first captive vortex. The sharp edge 122 helps the flow separate from the surface of the second component 120. Whilst a sharp edge may be preferable in this application, a rounded corner may be beneficial in other applications.

The second captive vortex may work with the jet from the gap in the seal 130, guiding the leakage flow 156 towards the peak 114. The first captive vortex may rotate clockwise (as viewed in FIG. 4) as a result of the direction of the jet. A curvature of the first recess portion 140 may help to establish the first vortex, which in turn guides the leakage flow 156 around the curvature of the first recess portion in the first component. The leakage flow 156 may emerge from the passage 155 and first recess portion 140 in a smooth controlled fashion, and in the same direction as the mainstream flow in the primary flow region 160.

As shown in FIG. 4, the mainstream flow direction is from left to right and the leakage flow 156 mixes with the mainstream more easily. The protruding portion 112 helps to hold the first vortex captive. The protruding portion 112 also assists by directing the flow in the same direction as the mainstream flow.

The first flow feature 142, e.g. first vortex, may be advantageous because it directs the leakage flow 156 into the mainstream flow in substantially the same direction as the mainstream flow. The following features may help to ensure this is the case:

The first recess portion 140 may be configured such that the centre of the first flow feature 142 may be between the edge 122 and the mainstream flow region 160 (e.g. above the main jet leakage path, which may separate at edge 122, as shown in FIG. 4).

The curvature of the first recess portion 140 may be configured such that it may collect the leakage jet substantially tangentially, (e.g. in a clockwise direction, relative to the flow feature 142 as shown in FIG. 4).

The first recess portion may comprise an arc of a circle.

The present disclosure may provide a means of controlling the high energy leakage jet 156 through the flow passage 155 so that it enters the mainstream 160 in a favourable direction. The shape of the flow passage 155 (e.g. first and/or second recess portions 140, 170) may be chosen to establish at least one captive vortex, which may maintain the same flow pattern over a wide range of leakage flow rates. This may in turn help to direct the leakage flow into the mainstream flow path in substantially the same direction as the mainstream flow, thereby helping to improve efficiency. Furthermore, the present disclosure may add the maximum energy to the mainstream flow in the most beneficial manner.

Figure 5A:
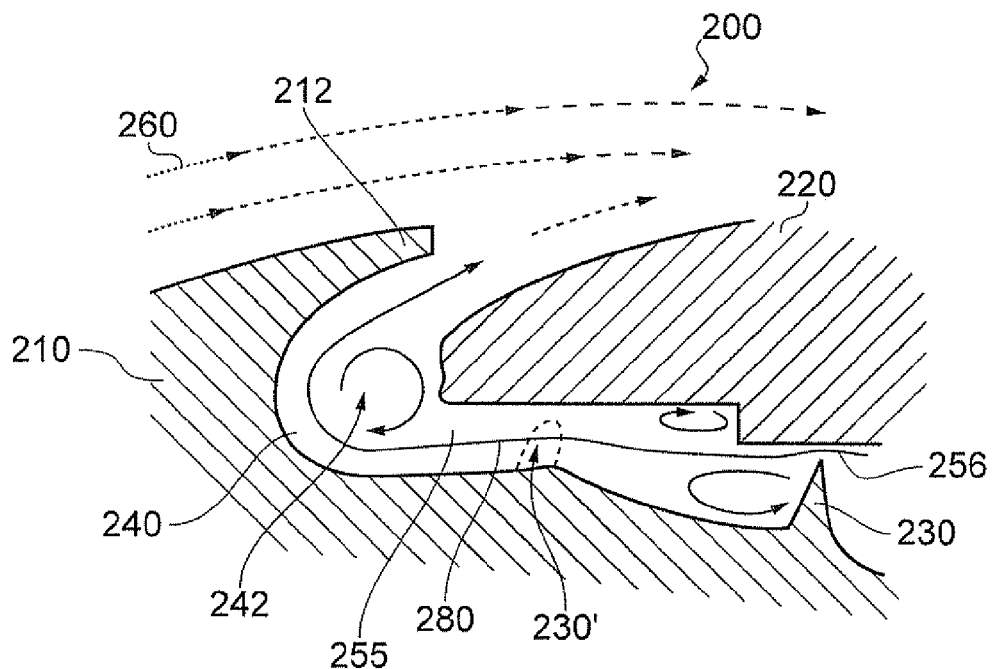
FIGS. 5($a$)-($c$) show seal assemblies according to second (FIG. 5($a$)), third (FIG. 5($b$)) and fourth (FIG. 5($c$)) examples of the present disclosure.

With reference to FIG. 5(a), a seal assembly 200 according to a second example of the present disclosure is shown. The last seal 230' (shown dotted in FIG. 5(a)) from a series of seals forming a labyrinth seal 230 may be removed. A flow nozzle 280 may therefore be formed in the flow passage 255 between the first and second components 210, 220. As for the first example, the seal assembly 200 may further comprise a first recess portion 240 and/or a second recess portion (not shown) forming first and second flow features respectively. A protruding portion 212 may be arranged to guide the portion of the first flow feature 242 formed in the first recess portion 240 into the primary flow 260. By removing the last seal fin on the labyrinth seal 230, enough space may be opened up to create a nozzle 280 for the leakage jet 256. Although there may be less sealing due to the absence of one fin 230', the leakage jet may be directed in a consistently controlled manner and may always set up a favourable first flow feature 242, e.g. first vortex. The first flow feature 242 may direct the leakage flow 256 into the mainstream flow 260 in substantially the same direction as the mainstream flow.

Figure 5B:
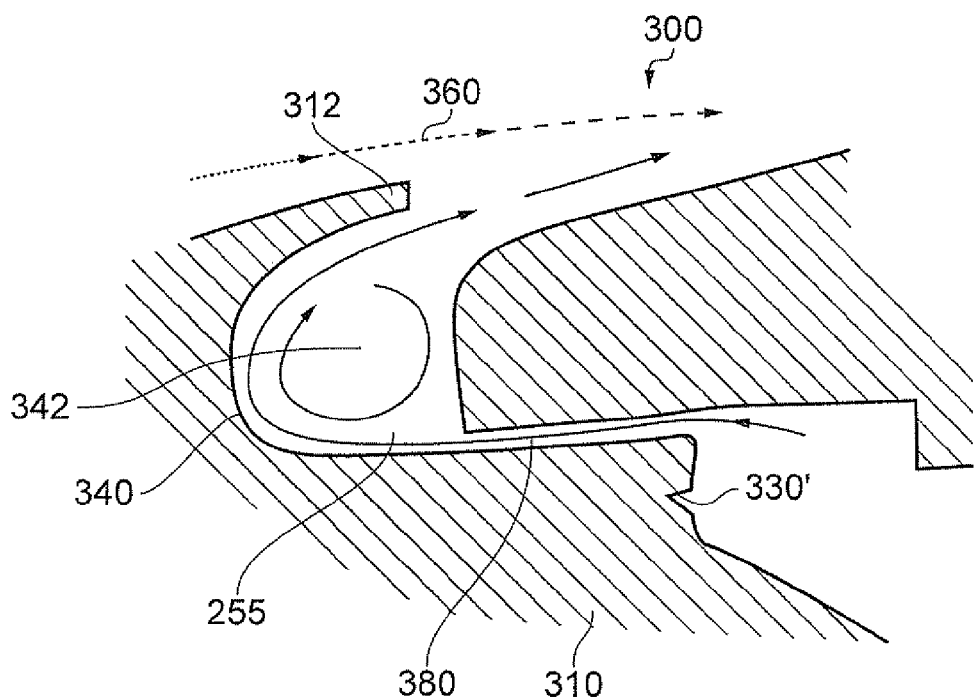

With reference to FIG. 5(b), a seal assembly 300 according to a third example of the present disclosure is shown. The third example is substantially similar to the first example of the seal assembly except that downstream of the last seal fin 330' there may be no step down in the profile of the first component 310. Accordingly, there may not be a second recess with the third example. A nozzle 380 may therefore be formed in the flow passage 355. The nozzle 380 may form a jet, which may in turn always establish a first flow feature 342, e.g. a vortex, which may rotate in a favourable direction in a first recess portion 340. The first flow feature 342 may direct the leakage flow 356 into the mainstream flow 360 in substantially the same direction as the mainstream flow. As for the first and second examples, a protruding portion 312 may be arranged to guide the portion of the first flow feature 342 formed in the first recess portion 340 into the primary flow 360.

Figure 5C:
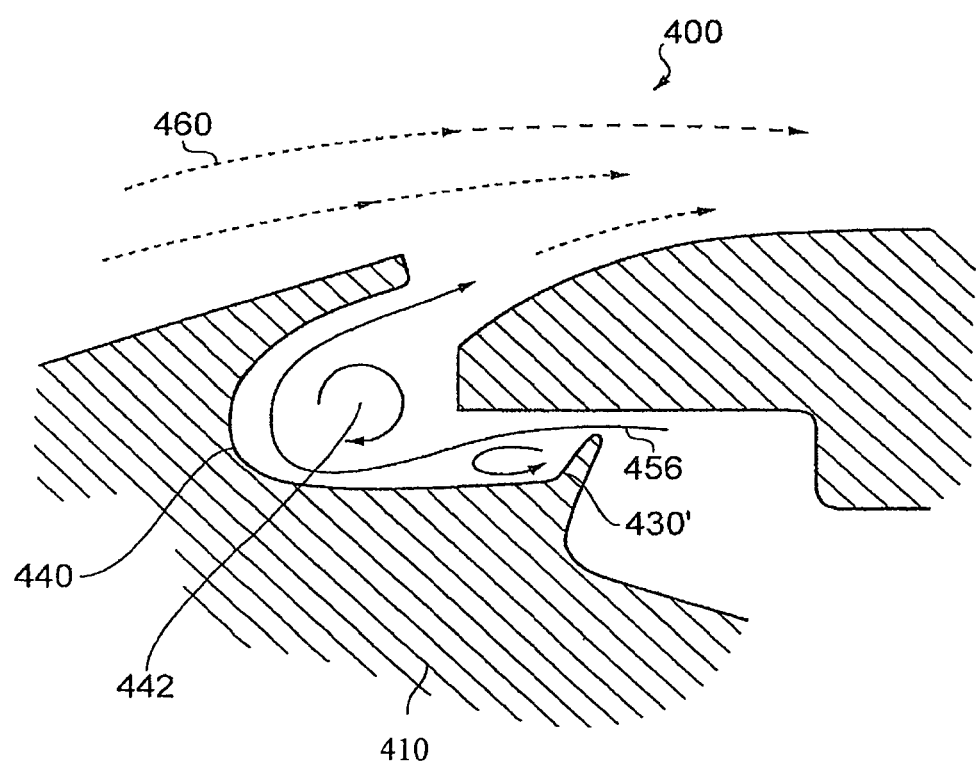

With reference to FIG. 5(c) a seal assembly 400 according to a fourth example of the present disclosure is shown. The fourth example is substantially similar to the first example of the seal assembly except that downstream of the last seal fin 430' there may be a partial step down in the profile of the first component 410. Accordingly, there may not be a second recess with the fourth example. The first flow feature 442 may be maintained in the first recess portion 440. The first flow feature 442 may direct a leakage flow 456 into the mainstream flow 460 in substantially the same direction as the mainstream flow.

Figure 6:
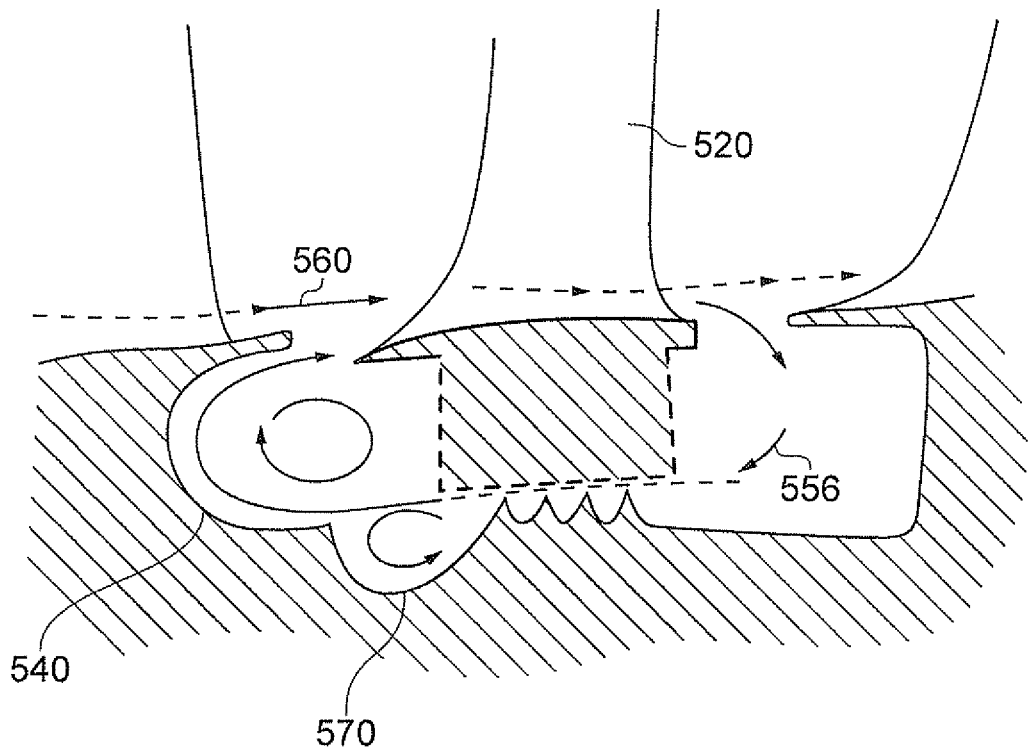
FIG. 6 shows a seal assembly according to the present disclosure applied to a stator shroud well.

With reference to FIG. 6 an example application for the present disclosure is shown. The above-described sealing assemblies may be used in a stator shroud well of a turbomachine, for example in a compressor or a turbine. As shown in FIG. 6, the static pressure may rise over compressor stator vanes 520 (or fall in the case of a turbine stator). As a result, a leakage flow 556 may travel under the stator 520 through a shroud well which is sealed. The first and/or second recess portions 540, 570 of the present disclosure may be applied to stator shroud well design as illustrated. This may help to ensure that the leakage flow re-enters the main gas-path 560 in a favourable direction.

Figure 7:
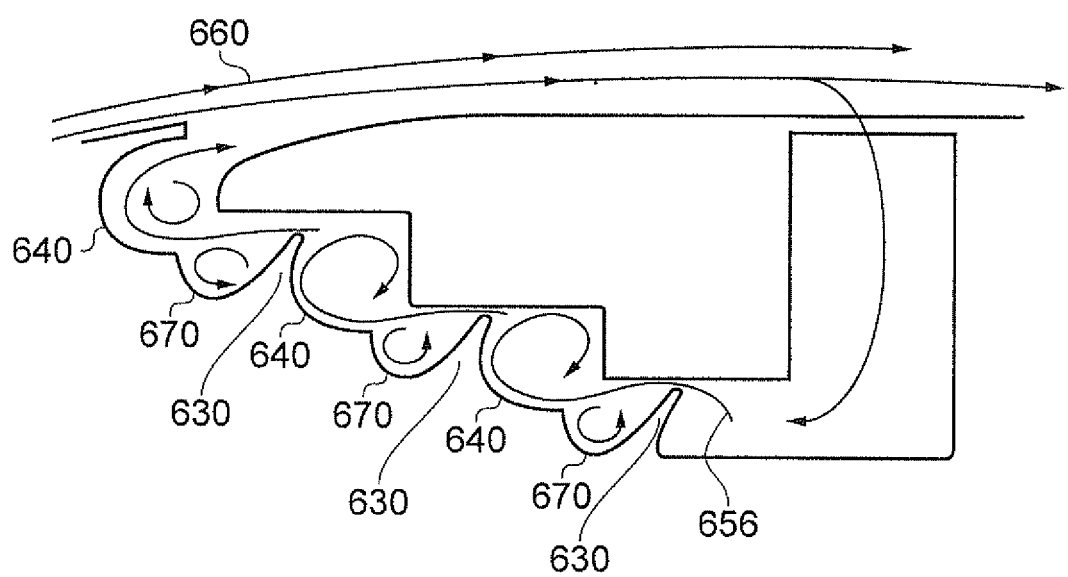
FIG. 7 shows a seal assembly according to the present disclosure applied to successive labyrinth seals.

With reference to FIG. 7 a further example for the present disclosure is shown. The above-described sealing assemblies may be used in a series of labyrinth seals 630, for example in a stator shroud well or anywhere that requires a seal between rotating and stationary components. Each seal 630 may comprise first and/or second recess portions 640, 670. Successive first recess portions 640 may direct the flow away from the next seal 630 such that a leakage flow over the next seal is minimised. The last first recess portion 640 in the sequence of seals 630 may direct the leakage flow 656 in a direction substantially similar to the direction of the mainstream flow 660. The application of the present disclosure shown in FIG. 7 may advantageously disrupt the flow over successive labyrinth seals and control the leakage jet from the final seal such that the jet may merge with the mainstream flow in a favourable manner.

Figure 1:
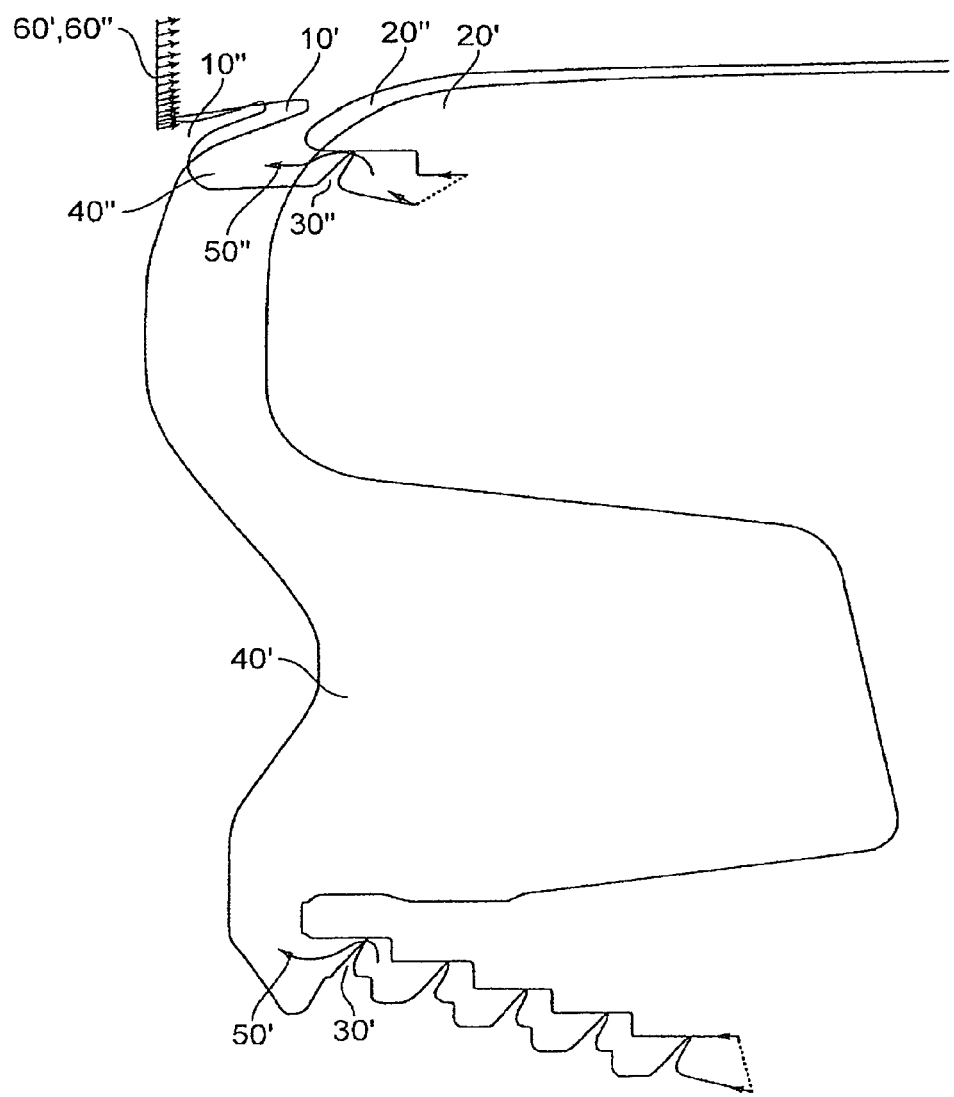
FIG. 1 shows two examples of prior art labyrinth seals.
Figure 2:
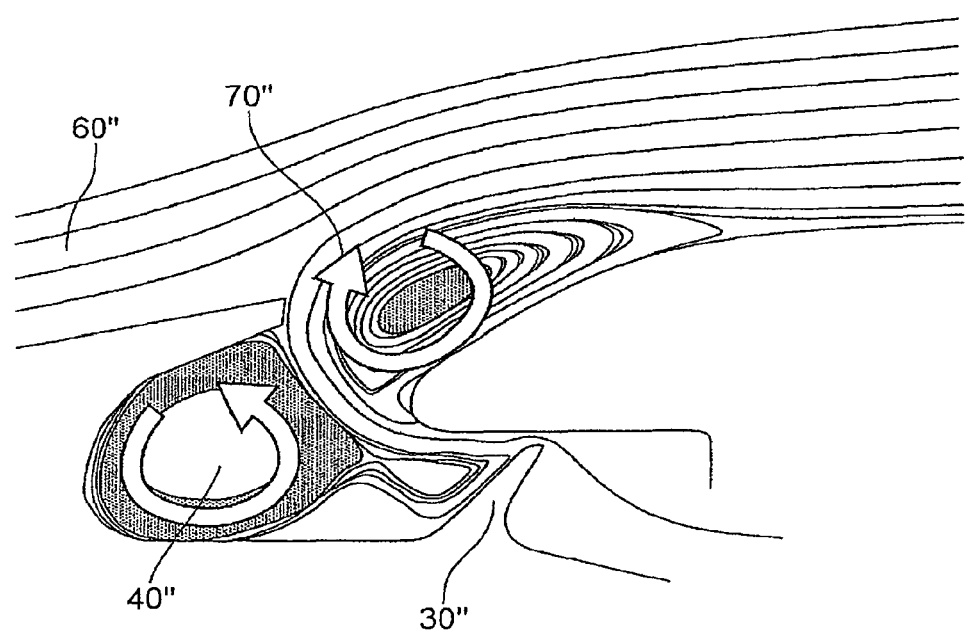
FIG. 2 shows flow streamlines for the second prior art labyrinth seal shown in FIG. 1.
Figure 3:
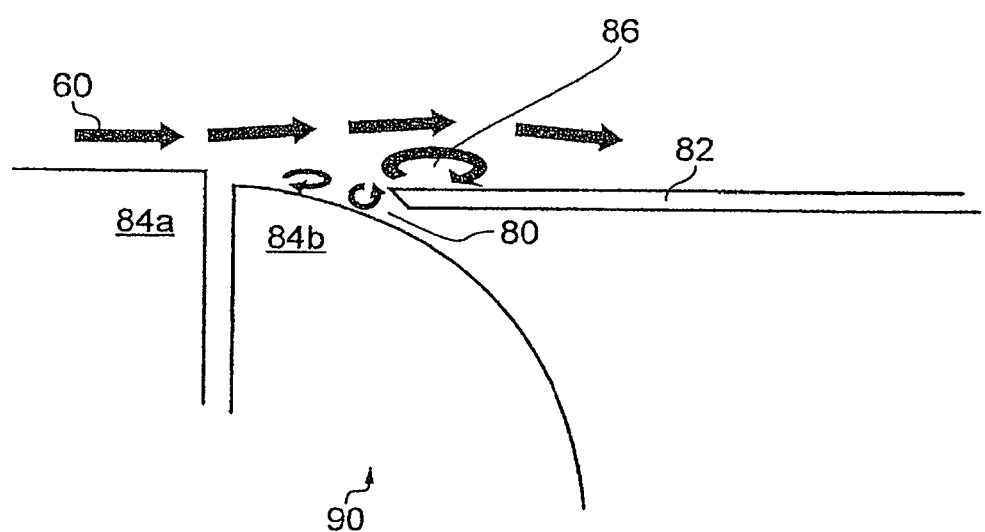
FIG. 3 shows a prior art thrust reverser door.
Figure 8A:
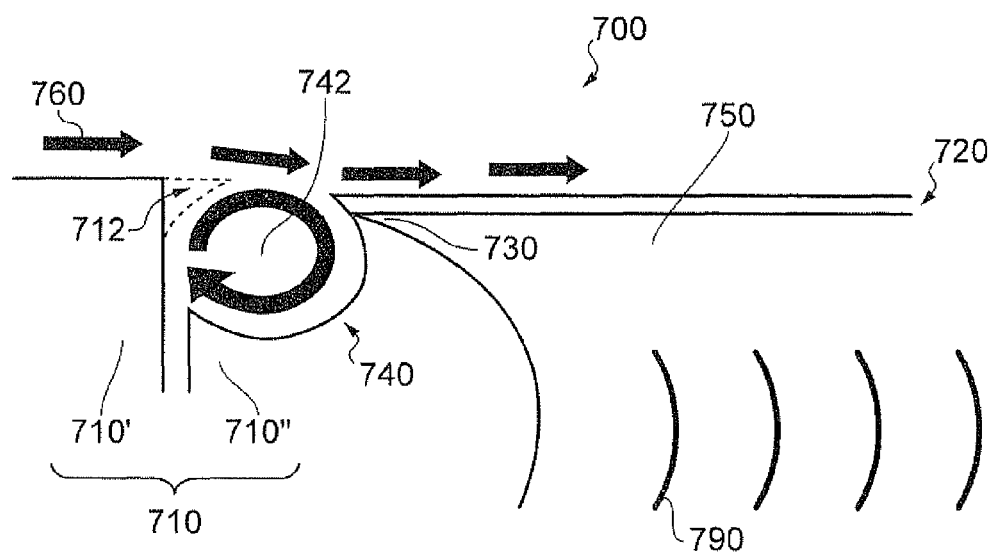
FIGS. 8($a$)-($b$) show a seal assembly according to the present disclosure applied to a thrust reverser unit with the thrust reverser door in a closed position (FIG. 8($a$)) and in an open position (FIG. 8($b$)).
Figure 8B:
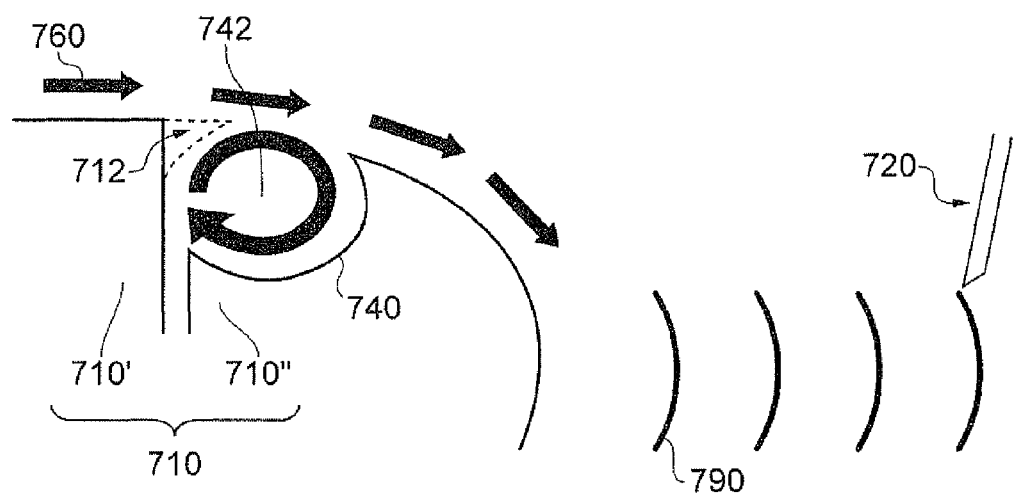

With reference to FIGS. 8(a) and 8(b) a further example of the present disclosure is shown. The above described sealing assembly may be applied to thrust reverser doors in a jet engine. As described above, with reference to FIG. 3, a seal 730 may be provided in a thrust reverser unit 700 for a jet engine between a second component 720, which may be in the form of blocker door, and a first component 710, which may be in the form of a fan casing. The seal 730 may limit flow from a primary flow region 760, e.g., a mainstream flow, to a secondary flow region 750. The fan casing 710 may comprise first and second portions 710', 710", the second portion being part of the thrust reverser unit 700. In a closed position, as shown in FIG. 8(a), the second component abuts the second portion 710" of the first component. The mainstream flow 760 may thus flow over the first and second components 710, 720.

A first recess portion 740 may be provided in the first component 710, in particular the second portion 710" of the first component. The first recess portion may be provided upstream of the gap 730 and may be exposed to the mainstream flow 760. The first recess portion 740 may be shaped such that a portion of the mainstream flow 760 may flow into the first recess portion 740 and that a first flow feature 742, e.g. a vortex, may be formed in the first recess portion 740. The first recess portion may be curved and may be concave. In the case of the first component comprising a fan casing, the first flow feature 742 may be a toroidal vortex. The first flow feature 742 may flow such that a portion of the first flow feature is shed to the mainstream flow region 760 in substantially the same direction as the flow in the mainstream flow region. Any uncontrolled vortices, which may have otherwise been formed by the gaps between the first and second components, may therefore be minimised.

The first component 710 may comprise an optional protruding portion 712. The protruding portion 712 may be arranged to guide the portion of the first flow feature 742 into the primary flow 760. The protruding portion 712 may at least partially define the first recess portion 740. The protruding portion 712 may also assist in guiding the primary flow from a surface of the first component 710 to a surface of the second component 720. The protruding portion may be wedge shaped.

As shown in FIG. 8(b), the second component 720 may be movable from the first position to a second position, in which the second component may redirect the primary flow 760 to the secondary flow region 750. The mainstream flow 760 may then flow over the first recess portion 740 and round a convex surface of the second portion 710" of the first component 710. The mainstream flow 760 may also flow through one or more guide vanes 790, which may be arranged in a cascade, for example, so that a thrust may be redirected.

The invention claimed is:

1. A seal assembly arranged adjacent to a primary flow region, the seal assembly comprising:
   first and second components; and
   a seal arranged between the first and second components to seal a secondary flow region from the primary flow region; wherein:
   a first recess portion is provided in the first component and arranged adjacent to the seal and the primary flow region;
   the first component comprises a protruding portion which is disposed adjacent the primary flow region and at leas partially defines the first recess portion;
   the first recess portion is arranged to receive flow from at least one of the primary flow region and the secondary flow region and shed flow to the primary flow region;
   the first recess portion is curved in order to promote a first flow vortex within the first recess portion so that a portion of the first flow vortex will flow to the primary flow region and will be shed to the primary flow region in substantially a same direction as a flow in the primary flow region;
   a second recess portion is provided in the first component and arranged between the first recess portion and the seal, the second recess portion being arranged to receive at least a portion of the flow from the secondary flow region and shed flow to the first flow vortex, the second recess portion being curved in order to promote a second flow vortex within the second recess portion; and
   the protruding portion is arranged to hold the first flow vortex captive within the first recess portion and direct the portion of the first flow vortex into the primary flow region in substantially the same direction as the flow in the primary flow region.

2. The seal assembly as claimed in claim 1, wherein surfaces of the first and second components are exposed to the primary flow region and the protruding portion guides the primary flow from a surface of one of the first component to a surface of the second component.

3. The seal assembly as claimed in claim 1, wherein the first and second recess portions are adjacent one another with a step change in a curvature of the surface of the first component at the interface between the first and second recess portions.

4. The seal assembly as claimed in claim 1, wherein the first and second recess portions are adjacent one another with a wedge shaped peak in the surface of the first component at the interface between the first and second recess portions.

5. The seal assembly as claimed in claim 1, wherein a surface of the second component comprises a surface feature arranged between the primary flow region and the secondary flow region, the surface feature being configured to promote flow separation of the flow from the secondary flow region such that at least a portion of the flow from the secondary flow region is directed into the first recess portion.

6. The seal assembly as claimed in claim 1, wherein the second component is movable from a first position, in which fluid in the primary flow region flows over surfaces of the first and second components with the second component sealing against the first component to limit flow from the primary flow region to the secondary flow region, to a second position, in which the second component redirects the primary flow to the secondary flow region.

7. The seal assembly as claimed in claim 6, wherein the first recess portion is provided upstream of the second component with respect to the primary flow.

8. The seal assembly as claimed in claim 1, wherein the protruding portion is wedge shaped.

9. The seal assembly as claimed in claim 1, wherein the first flow vortex rotates about an eye and is arranged to shed to the primary flow in the direction of flow in the primary flow region from one half of the vortex wherein a flow into the vortex is provided in an opposing direction to the direction of flow in the primary flow region and into the other half of the vortex.

10. A jet engine thrust reverser comprising the seal assembly of claim 1.

11. A turbomachine comprising a seal assembly as claimed in claim 1.

12. A gas turbine comprising a seal assembly as claimed in claim 1.

* * * * *